United States Patent
Minor et al.

(10) Patent No.: US 10,788,647 B2
(45) Date of Patent: Sep. 29, 2020

(54) ERECTOR CAM

(71) Applicant: LIGHTFORCE USA, INC., Orofino, ID (US)

(72) Inventors: Grant Minor, Orofino, ID (US); Kris Wisdom, Orofino, ID (US); Levi Bradley, Orofino, ID (US)

(73) Assignee: LIGHTFORCE USA, INC., Orofino, ID (US)

( * ) Notice: Subject to any disclaimer, the term of this patent is extended or adjusted under 35 U.S.C. 154(b) by 0 days.

(21) Appl. No.: 15/988,374

(22) Filed: May 24, 2018

(65) Prior Publication Data

US 2018/0341082 A1    Nov. 29, 2018

Related U.S. Application Data

(60) Provisional application No. 62/510,831, filed on May 25, 2017.

(51) Int. Cl.
| | | |
|---|---|---|
| *G02B 7/10* | (2006.01) | |
| *F41G 1/38* | (2006.01) | |
| *G02B 23/00* | (2006.01) | |

(52) U.S. Cl.
CPC ............. *G02B 7/10* (2013.01); *F41G 1/38* (2013.01); *G02B 23/145* (2013.01)

(58) Field of Classification Search
CPC ........... F41G 1/38; G02B 23/145; G02B 7/10; G02B 15/16; G02B 15/163; G02B 23/16; G02B 23/00
See application file for complete search history.

(56) References Cited

U.S. PATENT DOCUMENTS

| | | | | |
|---|---|---|---|---|
| 2,398,276 | A | | 4/1946 | Atman |
| 3,058,391 | A | | 10/1962 | Leupold |
| 3,121,134 | A | | 2/1964 | Heinzel |
| 3,992,083 | A | * | 11/1976 | Tanaka ............... G02B 7/10 359/683 |
| 4,172,634 | A | * | 10/1979 | Thompson ............ F41G 1/38 359/422 |
| 4,627,691 | A | * | 12/1986 | Tomori ............... G02B 7/10 359/700 |
| 5,867,740 | A | * | 2/1999 | Hamasaki ........... G02B 7/10 359/700 |
| 5,924,234 | A | | 7/1999 | Bindon et al. |

(Continued)

FOREIGN PATENT DOCUMENTS

WO    WO/2018/218002    11/2018

OTHER PUBLICATIONS

International Search Report of related PCT/US2018/034359, dated Aug. 7, 2018, 13 pages.

(Continued)

*Primary Examiner* — William R Alexander
*Assistant Examiner* — Balram T Parbadia
(74) *Attorney, Agent, or Firm* — Casimir Jones, S.C.; Thomas A. Isenberger

(57) ABSTRACT

Provided herein is technology relating to telescopic optics and particularly, but not exclusively, to devices and methods for moving a lens in a variable power optical device zoom system. The technology provides multiple followers per lens cell to move a lens with minimal or no reticle jump and finds use in, e.g., rifle scopes and other sensitive optic systems and devices.

15 Claims, 10 Drawing Sheets

(56) References Cited

U.S. PATENT DOCUMENTS

| | | | |
|---|---|---|---|
| 6,005,711 | A | 12/1999 | Mai et al. |
| 6,031,663 | A | 2/2000 | Funatsu et al. |
| 6,195,212 | B1 * | 2/2001 | Miyamoto ............... G02B 7/10 359/694 |
| 6,449,108 | B1 | 9/2002 | Bell |
| 7,944,611 | B1 | 5/2011 | Regan et al. |
| 8,314,994 | B1 | 11/2012 | Thomas et al. |
| 8,584,394 | B1 | 11/2013 | Thomas |
| 8,699,149 | B2 | 4/2014 | Hasselbach et al. |
| 2008/0218881 | A1 * | 9/2008 | Regan ..................... G02B 7/04 359/811 |
| 2010/0309462 | A1 * | 12/2010 | Thomas ................... F41G 1/38 356/247 |
| 2013/0318853 | A1 * | 12/2013 | Tesmar .................. G02B 23/04 42/123 |
| 2015/0022884 | A1 * | 1/2015 | Hakel ................. G02B 23/145 359/422 |
| 2015/0124243 | A1 | 5/2015 | Stockdill |

OTHER PUBLICATIONS

Fred Carson, Basic Optics and Optical Instruments (Dover Books Explaining Science; Courier Corporation 2011), pp. 4-23, 4-24, 4-31, and 4-32.

\* cited by examiner

ERECTOR CAM

This application claims priority to U.S. provisional patent application Ser. No. 62/510,831, filed May 25, 2017, which is incorporated herein by reference in its entirety

FIELD

Provided herein is technology relating to telescopic optics and particularly, but not exclusively, to devices and methods for moving a lens in a variable power optical device zoom system.

BACKGROUND

Typical riflescope erecting (zoom) systems comprise at least one moving lens element known as a lens cell. As the linear position of the lens cell changes along the optical axis of the riflescope, the magnification of the entire optical system changes, providing the zoom function of the variable power riflescope. In the riflescope zoom system, an erector tube comprising a linear track and a rotating cam tube comprising a helical track are used to change the linear position of the lens cell. A cam pin, called a follower, is attached to the lens cell and engages both the linear track in the erector tube and the helical track in the cam tube. As the cam tube is rotated, the helical track moves the follower along the linear track of the erector tube to move the lens cell.

For lens cells to move linearly within the erector tube, zoom systems are built with a small amount of mechanical tolerance between the cells and the tube. However, in a very sensitive optical system, e.g., a system wherein the objective lens group has an extremely short composite focal length, this mechanical tolerance produces an undesirable phenomenon known as "image jump" or "reticle jump", which is a sudden movement of the aiming reticle and/or the target within the field of view observed by a user through the riflescope. This jump occurs when a user manipulates the power change or zoom ring of the riflescope. Adjusting the power or zoom of the riflescope rotates the cam tube, which acts on the follower and lens cell to move the lens along the optical axis of the riflescope. During the power or zoom adjustment, an off-axis force is applied to the follower, which causes the lens cells to tilt slightly inside the erector tube. This lens tilt changes the path of the light passing through the optical system away from the optical axis of the optical system and produces the visible image jump or reticle jump. Accordingly, improved zoom systems are needed for riflescopes to eliminate or minimize image jump or reticle jump.

SUMMARY

Accordingly, provided herein is a technology for eliminating and/or minimizing image jump by eliminating and/or minimizing lens tilting during the adjustment of zoom or power by a user. The technology provides an optical device (e.g., a riflescope) erecting system comprising one or more lens cells that are moved within an erector tube by a rotating cam comprising multiple helical tracks. The multiple helical tracks (e.g., 2, 3, 4, etc.) act on an equal number of followers (e.g., 2, 3, 4, etc.) that are spaced radially about the circumference of the lens cells. Accordingly, the linear actuation force applied by the multiple helical tracks on the followers of the lens cell is distributed equally around the circumference of the moving lens cell, which minimizes and/or eliminates the tilting of the moving cell when the rotating cam tube acts on the follower(s).

During the development of embodiments of the technology described herein, erecting systems were constructed in which a rotating cam tube comprises two helical tracks per lens cell and two followers per lens cell. In some embodiments, the two helical tracks are spaced radially 180 degrees apart in the rotating cam tube. However, the technology is not limited to rotating cams comprising two helical tracks per lens cell, but encompasses erecting systems in which a rotating cam comprises three or more helical tracks and that operate according to the same principle as the rotating cam comprising two helices per lens cell acting and two followers per lens cell.

Accordingly, provided herein are embodiments of technology related to an optical device zoom system. In particular, the technology provides an optical device zoom system comprising a lens cell and a rotating cam tube comprising two or more helical tracks per lens cell (e.g., to move the lens cell with minimal or no reticle jump). In some embodiments, the lens cell comprises two or more followers (e.g., to apply pressure to two or more sides of the lens cell to minimize and/or eliminate reticle jump). In some particular embodiments, the optical device zoom system comprises two lens cells and two helical tracks per lens cell. In some embodiments the helical tracks have a constant pitch over their length and in some embodiments the helical tracks have a varying pitch over their length. In some embodiments, the rotating cam tube moves the lens cell with minimal or no reticle jump.

In some embodiments, the technology provides methods of making optical device systems with minimal or no reticle jump. In some embodiments, the method comprises providing a lens cell in an erector tube and inserting the erector tube into a rotating cam tube comprising two or more helical tracks. In some embodiments, the lens cell comprises two or more followers. In some embodiments, the erector tube comprises a linear track. In some embodiments, a follower of the lens cell engages a linear track in the erector tube. In some embodiments, the method further comprises engaging the followers of the lens cell with the two or more helical tracks of the rotating cam tube. In some embodiments, the rotating cam tube comprising two or more helical tracks is produced by a computer numerical control technology. In some embodiments, the rotating cam tube comprising two or more helical tracks is produced by a three-dimensional printing technology. In some embodiments, the rotating cam tube comprising two or more helical tracks is produced by a casting technology.

In still further embodiments, the technology provides a rifle comprising an optical device zoom system comprising a lens cell and a rotating cam tube comprising two or more helical tracks per lens cell. In addition, the technology provides use of an optical device zoom system comprising a lens cell and a rotating cam tube comprising two or more helical tracks per lens cell, e.g., use of an optical device zoom system comprising a lens cell and a rotating cam tube comprising two or more helical tracks per lens cell to minimize or eliminate reticle jump. And, in some embodiments, the technology provides use of an optical device zoom system comprising a lens cell and a rotating cam tube comprising two or more helical tracks per lens cell to shoot a target.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings:

FIG. 7 shows an embodiment of the technology providing a zoom system comprising two lens cells 210 and 220 within an erector tube 240. Lens cell 210 comprises two followers 211A and 211B; lens cell 220 comprises two followers 221A and 221B. Cam pressure is applied to the followers on opposite sides of the lens cells, thus minimizing and/or eliminating deflection of the optical axis 230 and thus minimizing and/or eliminating image jump.

Figure 1:
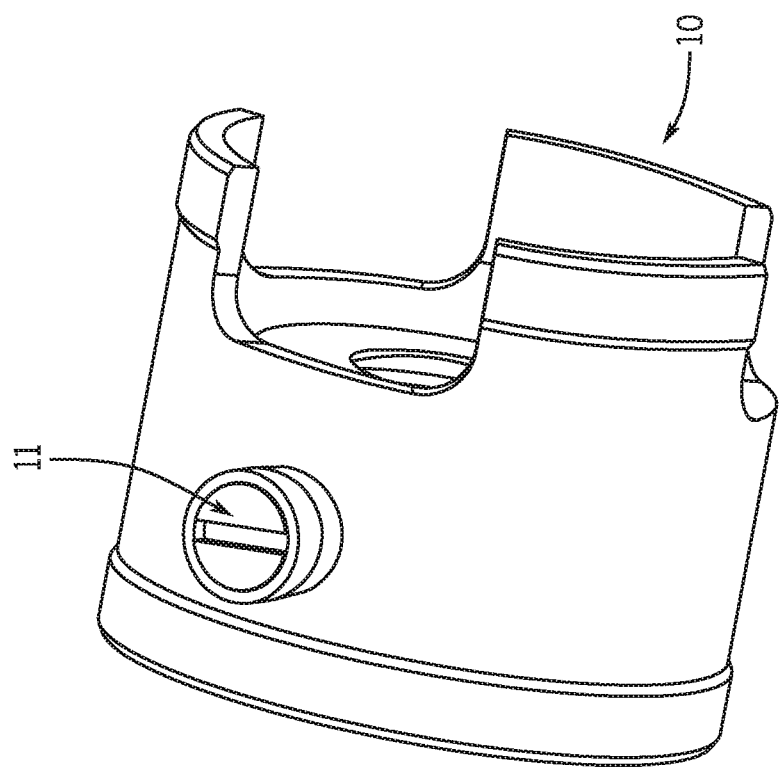
FIG. 1 is a drawing of a lens cell 10 comprising a single follower 11, e.g., as used in traditional riflescope zoom systems.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to telescopic optics and particularly, but not exclusively, to devices and methods for moving a lens in a variable power optical device zoom system. The technology eliminates and/or minimizes image jump in an optical device view by eliminating and/or minimizing lens tilting during the adjustment of zoom or power by a user.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, an "erector lens" refers generally to an intermediate lens in an optical device that re-inverts the image from the objective lens to an upright position, e.g., for viewing by a user. However, this term should be understood to mean any similarly adjustable lens in an optical device or instrument.

As used herein, the term "follower" or "cam follower" or "cam pin" refers to a protrusion (e.g., a pin, screw, tab, etc.) from a lens cell (e.g., an erector lens mount) that engages a track in an erector tube and/or in a rotating cam tube or that serves an analogous purpose. In some embodiments, the follower is integral to the lens cell and in some embodiments the follower is detachable. See, e.g., FIG. 1 showing a lens cell 10 comprising a single follower 11. In some embodiments, a lens cell comprises two or more followers distributed around the circumference of the lens cell.

As used herein, the term "optical device" refers generally to an optical device as discussed herein. In some embodiments, this term encompasses any similar optical device or instrument, such as a riflescope, a telescope, a pistol scope, or a spotting scope, which uses a sliding lens.

As used herein, a "helix" and derivatives (e.g., "helical") refers to a type of smooth curve in three-dimensional space wherein a tangent line at any point makes a constant angle with a fixed line called the axis of the helix or helical axis. A "normal plane" of a helix is a plane normal to the axis of the helix and through which the helix passes. The "pitch" of a helix is the height of one complete helix turn as measured parallel to the axis of the helix.

The pitch of a helix may vary along the length of a helix. The pitch of a helix may be constant over the length of the helix. A "circular helix" is a helix wherein the distance from any point on the helix to the helical axis along a line perpendicular to the axis is constant. A circular helix projected onto a normal plane is a circle having a center at the axis of the helix. A helix can be described mathematically in an x, y, z coordinate system using the equations $x(t)=\cos(t)$; $y(t)=\sin(t)$; and $z(t)=t$. A circular helix of radius a and slope b/a (or pitch $2\theta b$) is described using the equations $x(t)=a\cos(t)$; $y(t)=a\sin(t)$; and $z(t)=b\,t$. The chirality of a helix can be switched by negating any one of the three equations. Helices that are coaxial have the same axis. When two coaxial helices are "m degrees apart" or "arranged at a spacing of m degrees" (e.g., on the circumference of a rotating cam tube), the point of intersection of the first helix with a normal plane and the point of intersection of the second helix with the same normal plane are m degrees apart on a circle in the normal plane that contains both points of intersection.

DESCRIPTION

Figure 2:
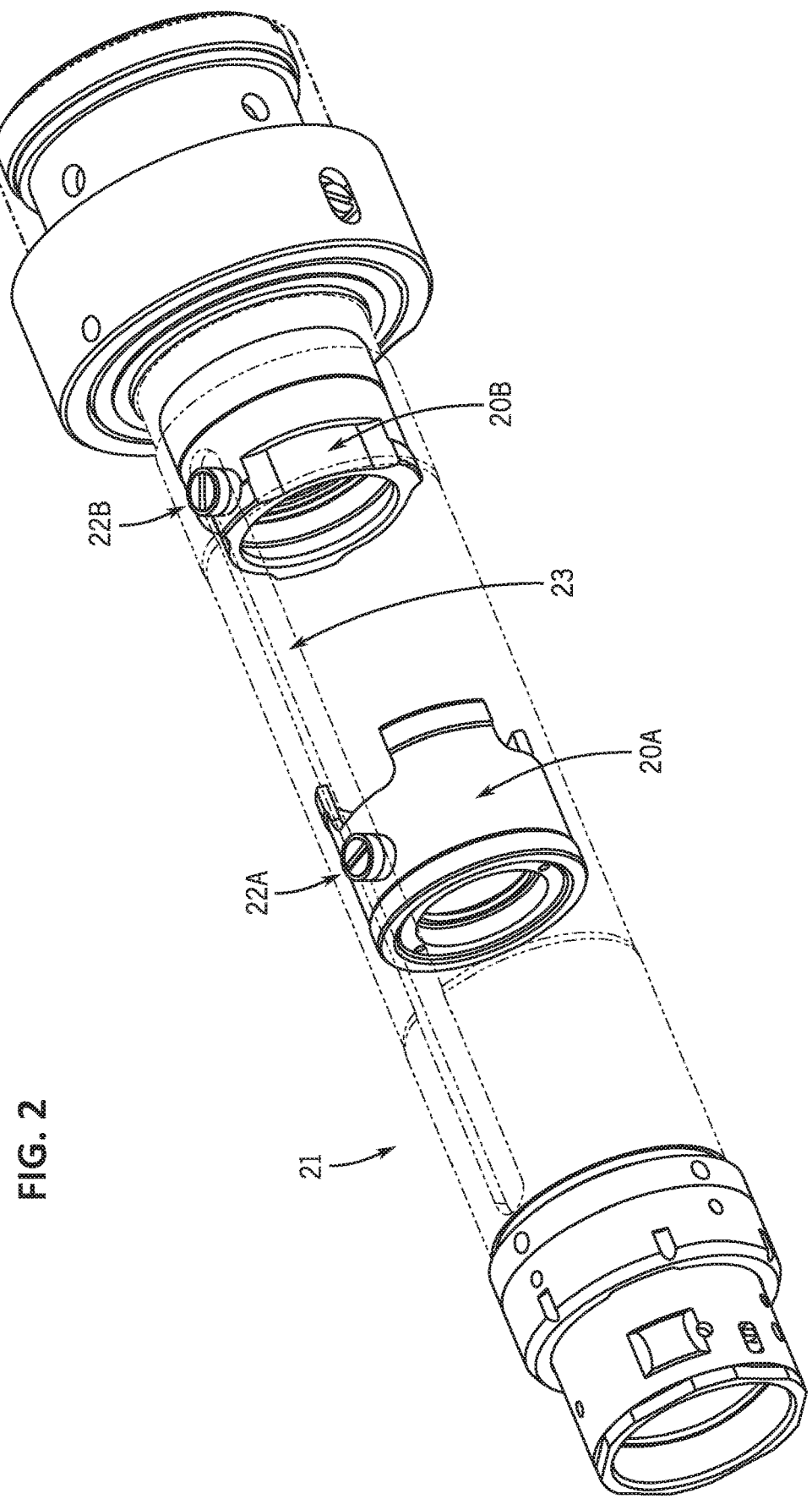
FIG. 2 is a drawing of two lens cells 20A and 20B in an erector tube 21. Each lens cell comprises a single follower 22A and 22B that moves within the linear track 23 in the erector tube 21.
Figure 3:
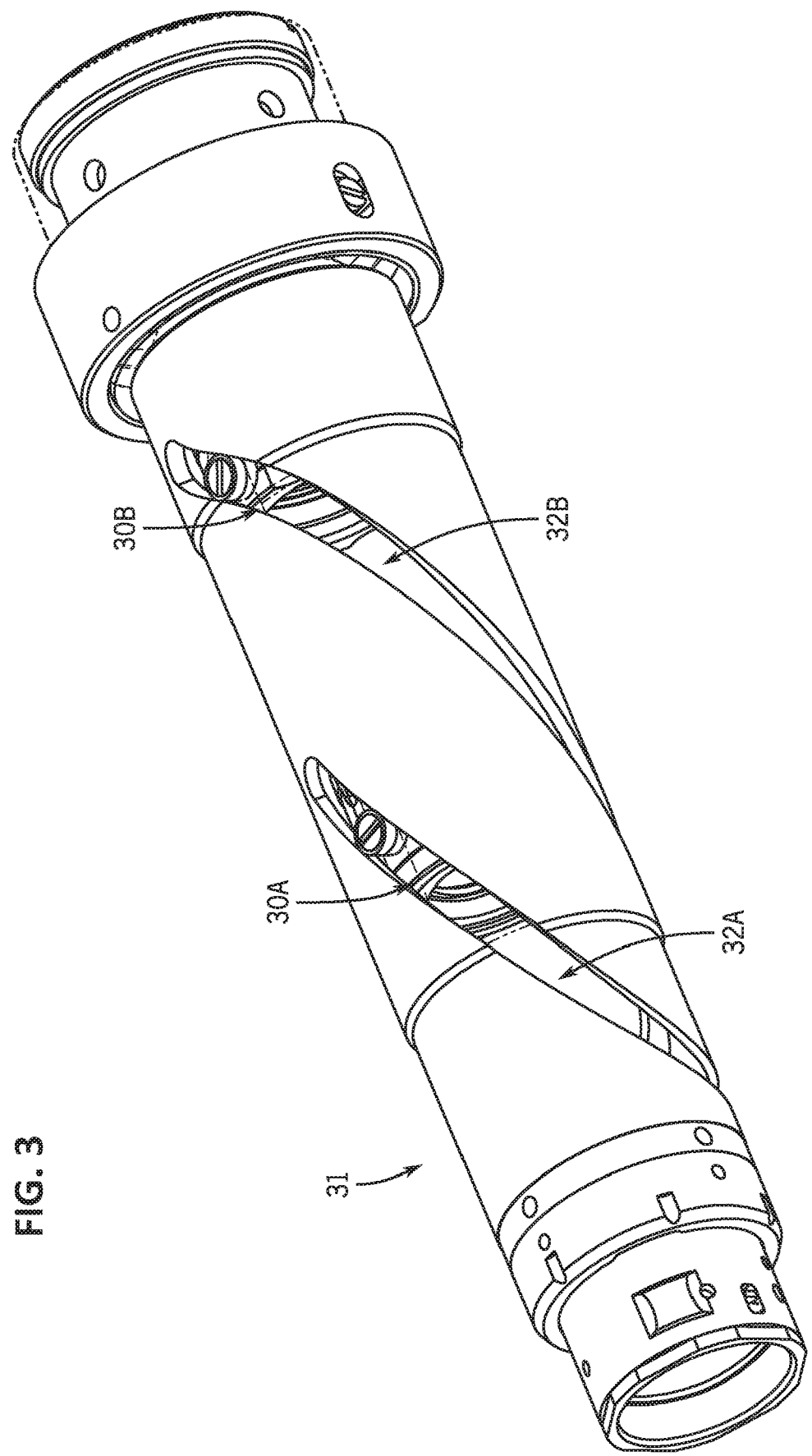
FIG. 3 is a drawing of two lens cells 30A and 30B within an erector tube and a rotating cam tube 31 comprising a single helical track 32A and 32B for each lens cell 30A and 30B, e.g., as used in traditional riflescope zoom systems.
Figure 4:
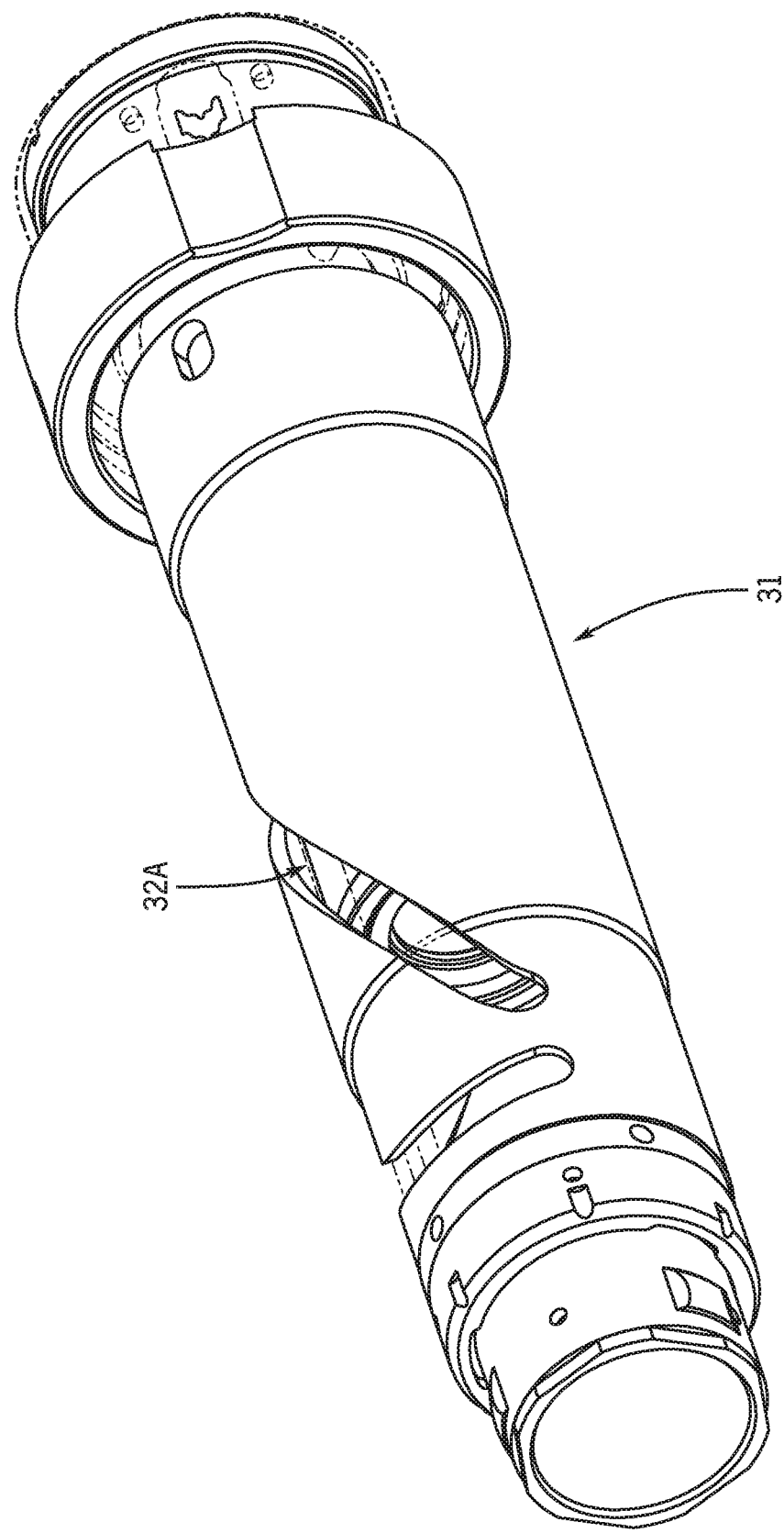
FIG. 4 is a 180° view of the traditional riflescope erector assembly shown in FIG. 3 showing helical track 32A in the rotating cam tube 31.
Figure 5:
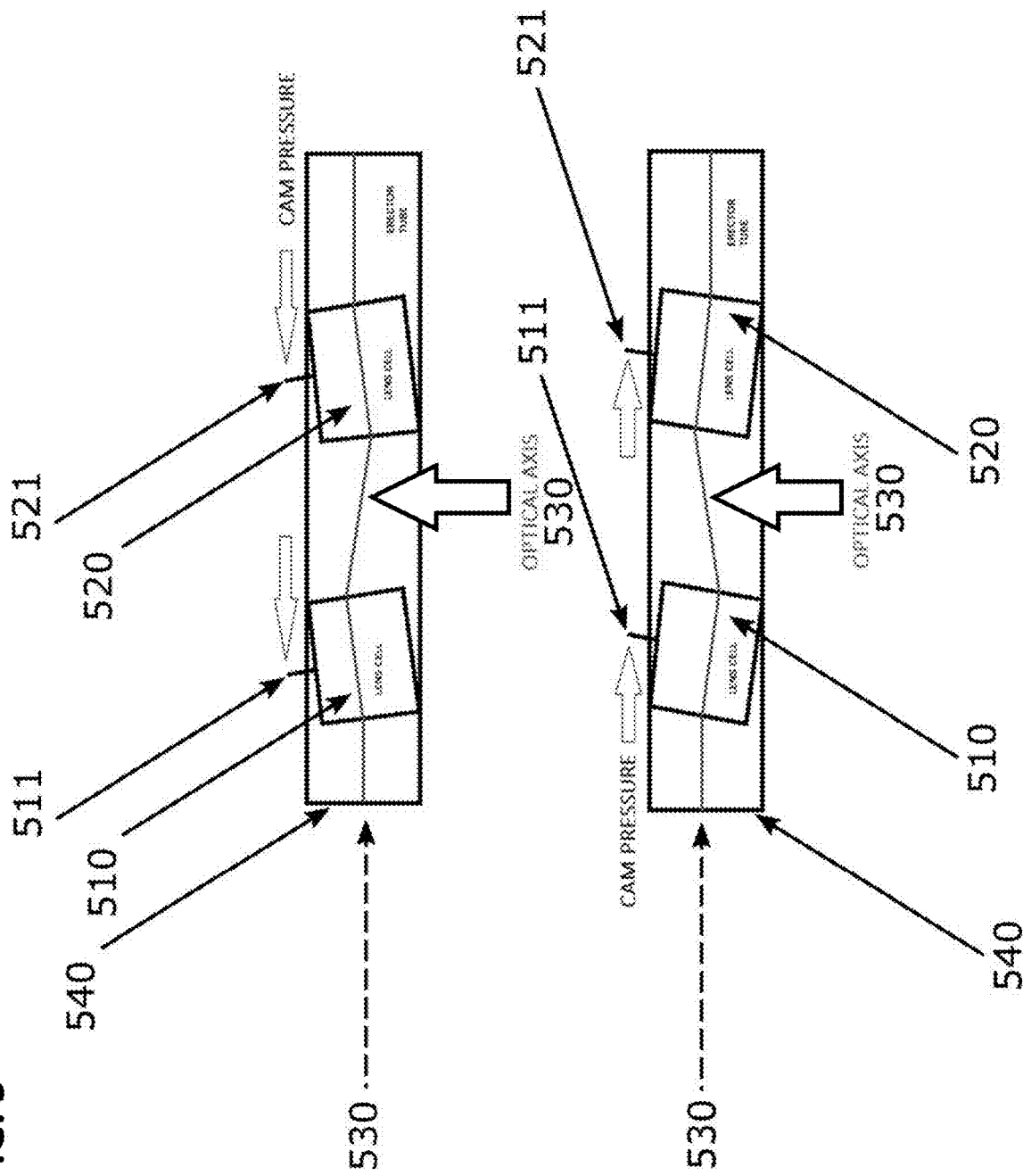
FIG. 5 is a drawing showing the lens tilt phenomenon that causes reticle jump or image jump in traditional riflescope erectors. Pressure on the single followers 511 and 521 causes the lens cells 510 and 520 to deflect the optical axis 530 within the erector tube 540, thus causing lens tilt and image jump.

Provided herein is technology relating to optics (e.g., magnifying and/or telescopic optics) and particularly, but not exclusively, to devices and methods for moving a lens in a variable power optical device zoom system. In particular, the technology described herein provides a rotating cam (e.g., and optical device zooming systems comprising a rotating cam) comprising two or more (e.g., 2, 3, 4, 5, etc.) helical tracks per lens cell that are spaced around the circumference of the rotating cam tube. In some embodiments, a zoom system comprises a lens cell comprising two or more followers that engage with the two or more helical tracks. While, in some embodiments, a rotating cam tube comprises two helical tracks arranged around the circumference of the rotating cam tube at a spacing of 180°, the technology is not limited to such designs, but encompasses zoom systems and rotating cam tubes comprising three or more helical tracks per lens cell that operate according to the same principle as the two-helix design. The technology provides advantages relative to prior optical device zoom systems comprising a lens cell with a single follower (see, e.g., FIGS. 1-5) provided within an erector tube (see, e.g., FIG. 2) and a rotating cam tube comprising one helical track per lens cell (see, e.g., FIG. 3 and FIG. 4). While the prior technologies suffer from reticle jump (see, e.g., FIG. 5), the technology described herein minimizes and/or eliminates reticle jump as described below. Although the disclosure herein refers to certain illustrated embodiments, it is to be understood that these embodiments are presented by way of example and not by way of limitation.

Erector Tube Comprising Two or More Helical Erector Cams

Figure 6:
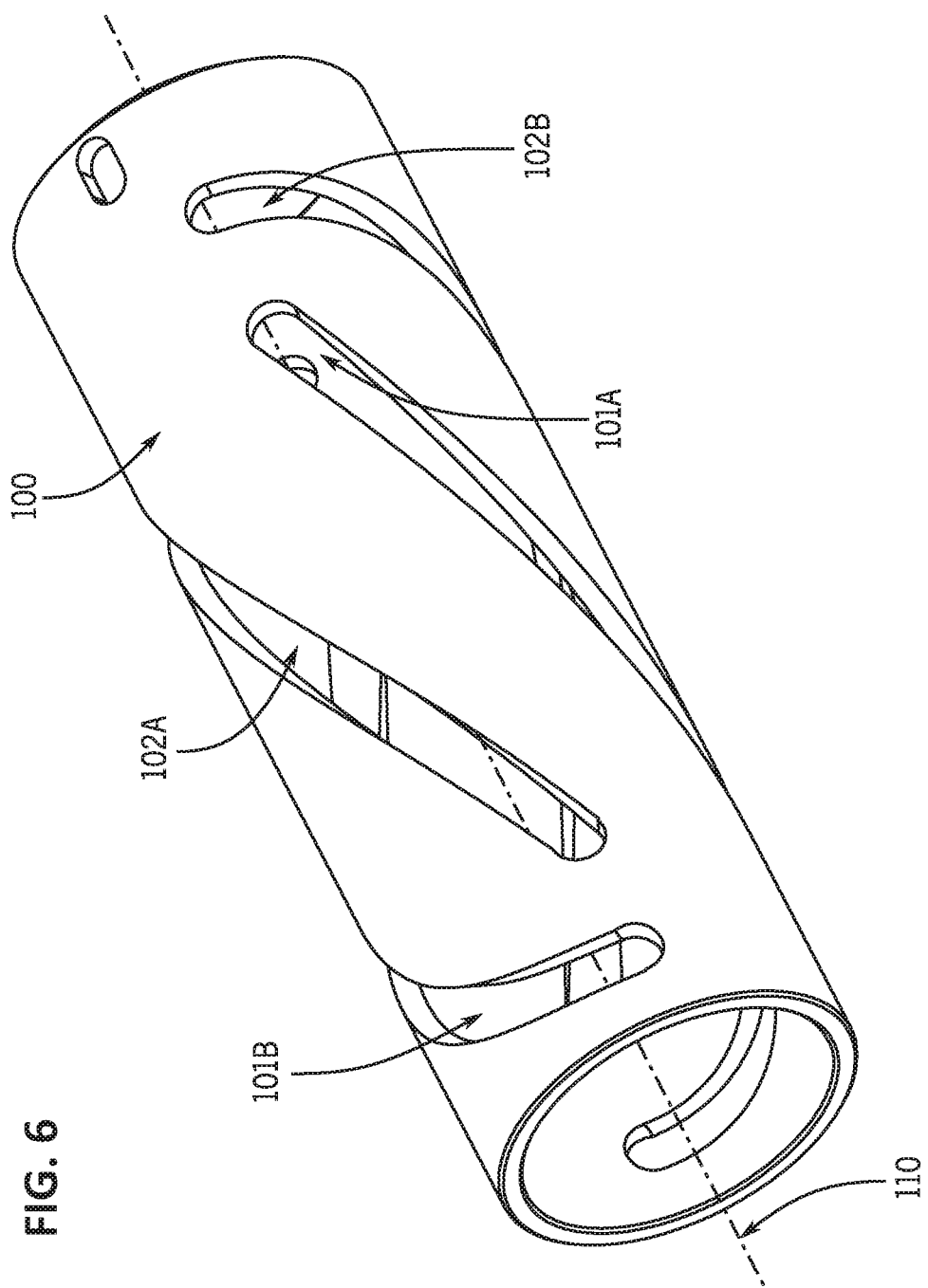
FIG. 6 is an isometric drawing of a rotating cam tube as provided by the technology described herein. In the embodiment shown, the rotating cam tube 100 comprises two sets of paired helical tracks (101A and 101B; 102A and 102B). The helical track 101A is located 180° from the helical track 101B on the circumference of the cam to engage two cam followers located 180° apart on the periphery of a first lens cell. The helical track 102A is located 180° from the helical track 102B on the circumference of the cam to engage two cam followers located 180° apart on the periphery of a second lens cell.

FIG. 6 shows an embodiment of the rotating cam tube technology provided herein. In FIG. 6, the rotating cam tube 100 is a cylinder having an axis 110 and two circular ends having centers on the axis 110. The ends of the rotating cam tube have a radius and a circumference. The axis 110 of the rotating cam tube is substantially and/or essentially parallel to (e.g., in some embodiments, substantially and/or essentially the same as) the optical axis of the optical device. In some embodiments, a zoom system comprises an erector tube and a rotating cam tube that both have an axis that is substantially and/or essentially parallel to the optical axis of the optical device (e.g., the erector tube and rotating cam tube are essentially and/or substantially coaxial and their shared axis is substantially and/or essentially the same as and/or substantially and/or essentially parallel to the optical axis of the optical device). The rotating cam tube comprises one or more sets of helical tracks (e.g., wherein a set of helical tracks comprises two or more coaxial helical tracks), e.g., one or more sets of helical tracks per each lens cell in a zoom assembly. In some embodiments, the rotating cam tube comprises f(f=2, 3, 4, 5, etc.) helical tracks per lens cell that, in some embodiments, are arranged around the circumference of the rotating cam tube at a spacing of (360°/f). In some embodiments, a set of helical tracks (e.g., comprising 2 or more helical tracks) comprises two or more coaxial helical tracks.

The embodiment of the rotating cam tube shown in FIG. 6 comprises two pairs of coaxial helical tracks for each lens cell that moves through the erector tube (101A; 101B for a first lens cell and 102A; 102B for a second lens cell). In some embodiments, each helical track is a slot or groove penetrating through the cylinder of the rotating cam tube. Each helical track is adapted to accept and/or accepts a follower of a lens cell and moves the lens cell along the axis 110 by applying a physical force on the follower attached to the lens cell when the rotating cam tube is rotated around the axis 110.

In the embodiment shown in FIG. 6, the rotating cam tube comprises two pairs of helical tracks, e.g., one pair of tracks for each of two lens cells in the embodiment shown (e.g., an embodiment comprising two lens cells). However, the technology is not limited to a rotating cam tube comprising two pairs of helical tracks. The technology provides a cam tube comprising two or more helical tracks per lens cell; accordingly, the technology encompasses zooming systems comprising 1 movable lens cell, 2 movable lens cells, 3 movable lens cells, 4 movable lens cells, or 5 or more movable lens cells, wherein each movable lens cell engages and is moved by two or more helical tracks present in the rotating cam tube.

Thus, the technology provides a cam tube (and zoom systems comprising a cam tube) comprising a number of helical tracks N that is provided by equation 1;

$$N = n \times f \qquad (1)$$

Where n is the number of movable lens cells of the zoom system and f is the number of followers per movable lens cell and/or the number of helical tracks per movable lens cell. In some embodiments, a lens cell comprises f followers arranged around the circumference of the lens cell at an interval of (360°/f). Accordingly, in some embodiments, the rotating cam tube comprises (helical tracks per lens cell arranged around the circumference of the cam tube at an interval of (360°/f). The embodiment of the rotating cam tube shown in FIG. 6 is rotating cam tube having N=4, n=2, and f=2.

Unless specifically noted, the helical tracks described herein are circular helices. In some embodiments, a rotating cam provided herein comprises a helical track having a constant pitch along its length. In some embodiments, a rotating cam provided herein comprises a helical track having a varying pitch along its length.

Figure 7:
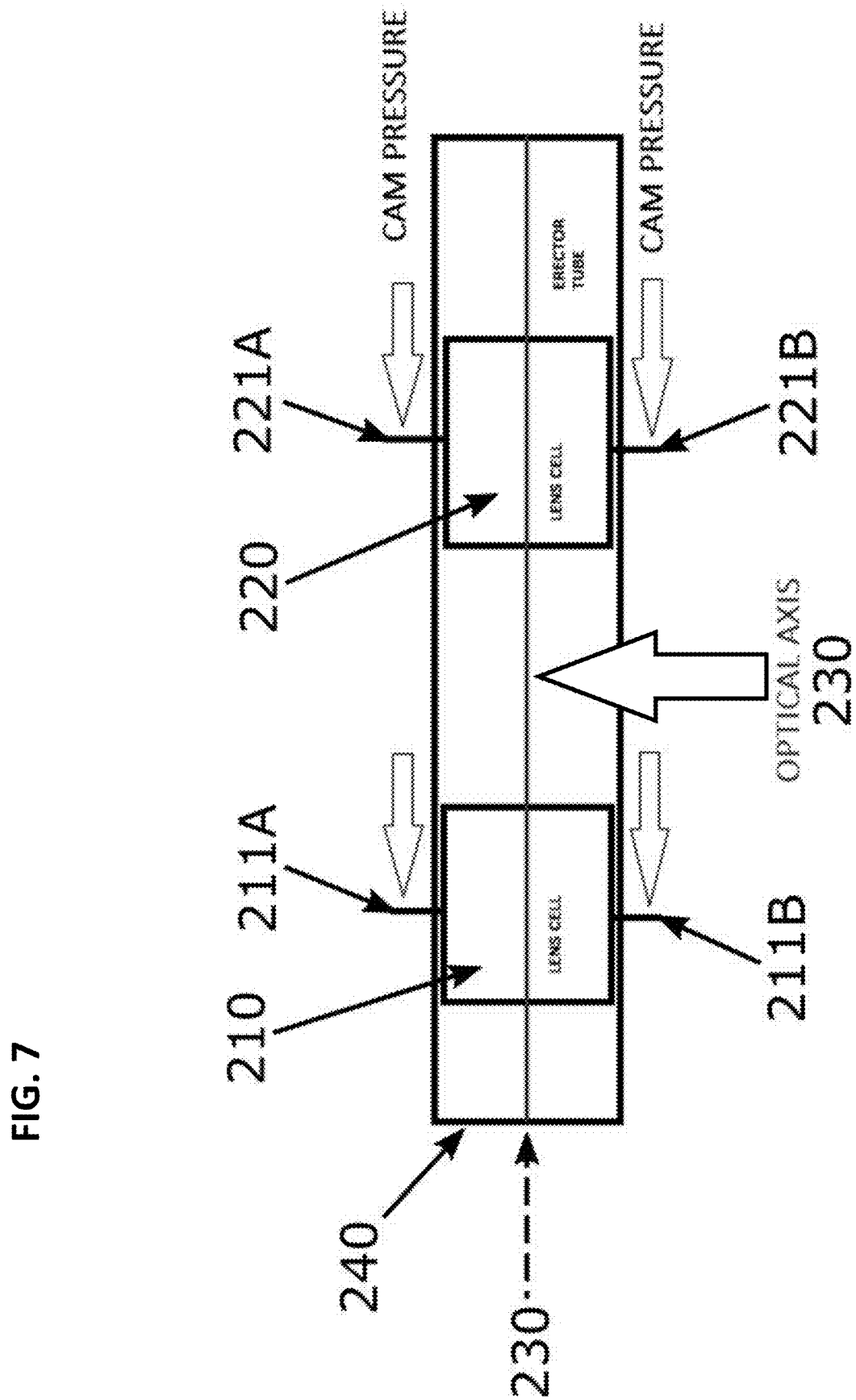
FIG. 7 is a drawing showing that the zoom system described herein (comprising a rotating cam tube comprising multiple helical tracks per lens cell) applies cam pressure on two sides of the lens cell to minimize and/or eliminate lens tilt and minimize and/or eliminate image jump or reticle jump.

As shown in FIG. 7, a rotating cam tube comprising 2 or more helical tracks and lens cells (210 and 220) each comprising 2 or more followers (211A, 211B, 221A, 221B) moves the lenses through the erector tube 240 with minimal or no lens tilt with respect to optical axis 230 and little or no associated reticle jump, e.g., the lenses move in the erector tube 240 of the zoom system and substantially or essentially maintain the image axis 230 to be parallel with the axis of the erector tube.

In some embodiments, the diameter of the rotating cam tube is approximately 1 inch (e.g., 0.80 to 1.20 inches, e.g., 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 inches). In some embodiments, the inner diameter of the rotating cam tube is approximately 1 inch (e.g., 0.80 to 1.20 inches, e.g., 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 inches); in some embodiments, the outer diameter of the rotating cam tube is approximately 1 inch (e.g., 0.80 to 1.20 inches, e.g., 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, or 1.20 inches).

In some embodiments, the helical tracks have a width of approximately 0.05 to 0.25 inches (e.g., 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, or 0.25 inches).

In some embodiments, each helical track of a set of helical tracks has the same chirality and the same pitch. In some embodiments wherein the helical tracks have a pitch that varies along their length from a first end of the rotating cam tube to the other end of the rotating cam tube, each helical track of the set of helical tracks has a pitch that varies in the same way as a function of distance from one end of the helix to the other end of the helix. In some embodiments, the helical tracks of a set of helical tracks are related to one another by rotational symmetry around the helical axis. In some embodiments, the helical tracks make approximately 0.1 to 2.0 (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0) turns around the circumference of the rotating cam tube over the length of the helical track.

Rifle Scopes

Related embodiments provide an optical device comprising a rotating cam tube as described herein, e.g., a rotating cam tube comprising two or more helical tracks for each lens cell. That is, some embodiments provide an optical device comprising an erector tube (e.g., comprising a linear track), a rotating cam tube comprising two or more helical tracks, and a lens cell (e.g., comprising a lens and two or more followers adapted to engage the two or more helical tracks). Some embodiments of optical devices comprise two or more movable lens cells, wherein each lens cell is moved by a rotating cam tube comprising a set of two or more helical tracks per lens cell. As described herein, an optical device comprising a rotating cam tube comprising two or more helical tracks to engage and move two or more followers on a lens cell minimizes and/or eliminates the phenomenon of reticle jump.

Methods of Manufacture

Related embodiments provide methods for constructing an optical device that minimizes and/or eliminates the phenomenon of reticle jump. In some embodiments, methods comprise providing a lens cell comprising two or more followers (two or more followers on the periphery of the lens cell), providing an erector tube comprising a linear track, and making or providing a rotating cam tube comprising two or more helical tracks per lens cell. In some embodiments, methods comprise providing a lens cell comprising two or more followers within an erector tube and inserting the erector tube and lens cell within a rotating cam tube comprising two or more helical tracks such that the helical tracks engage the followers of the lens cell.

Methods of making a rotating cam tube comprising two or more helical tracks per lens cells include, e.g., casting and machining. For example, in some embodiments a rotating cam tube as described herein is made using a technology such as computer numerical control (CNC) technologies, e.g., comprising automating machine tools that are operated by programmed commands encoded by software on a computer. In some embodiments, a rotating cam tube as described herein is produced by three-dimensional printing. In some embodiments, a rotating cam tube as described herein is produced by methods comprising use of a mold and casting technologies.

Example

Figure 8:
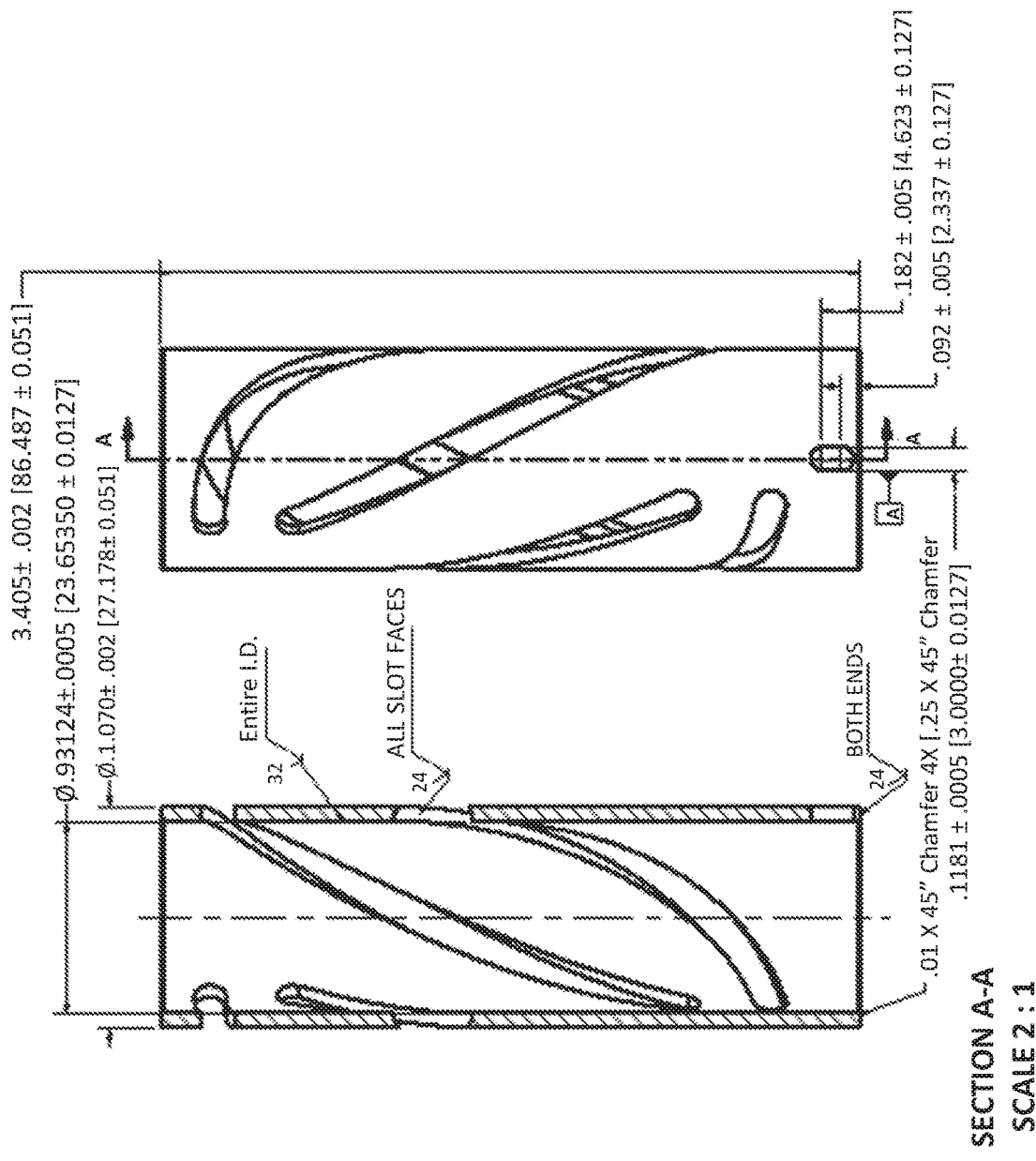
FIG. 8 shows a portion of a computer assisted design (CAD) drawing of an embodiment of a rotating cam tube comprising two sets of helical tracks.
Figure 9:
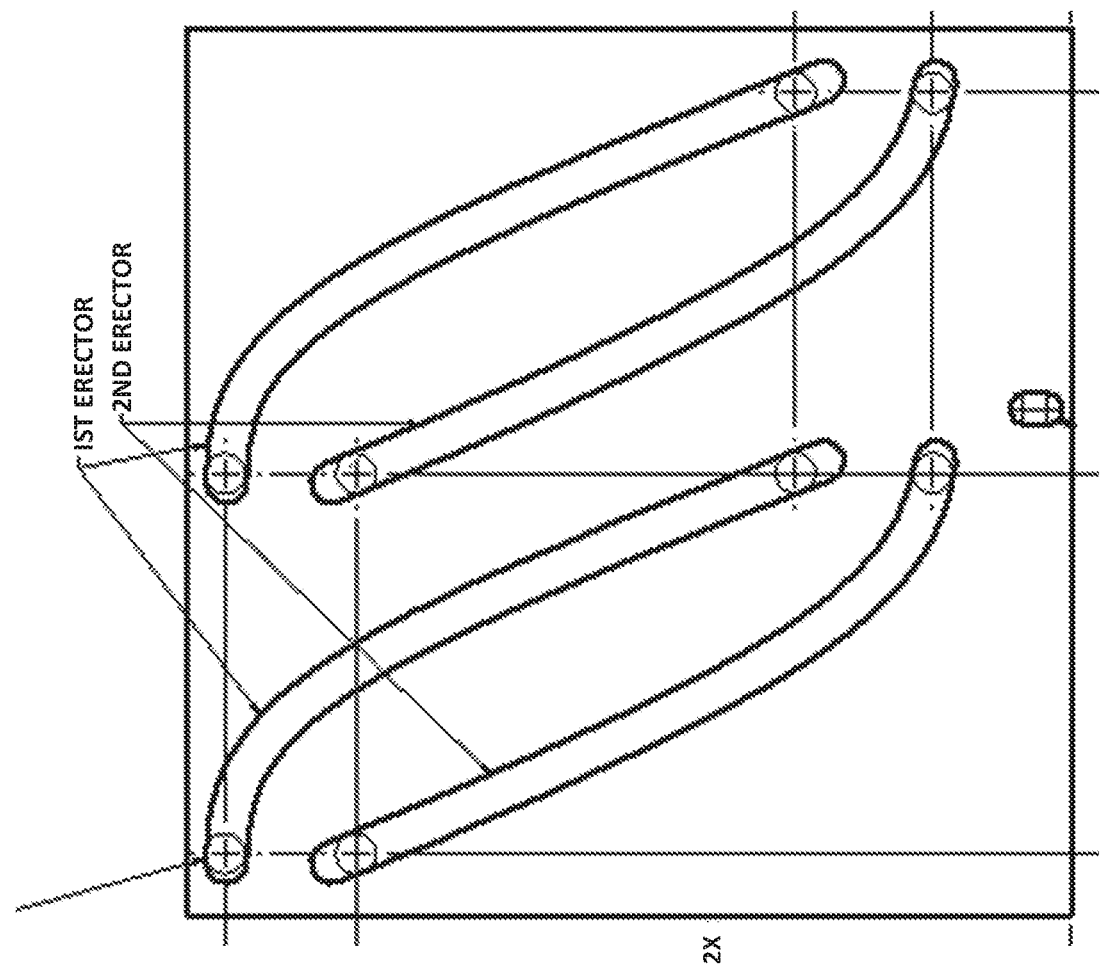
FIG. 9 shows a CAD drawing of the rotating cam tube cylinder of FIG. 8 "unrolled" to form a rectangle comprising the curves that are the helical tracks in the cylindrical rotating cam tube.
Figure 10:
FIG. 10 is a photograph of an embodiment of the technology after assembly. The riflescope zoom system comprises two movable lens cells and a rotating cam tube comprising two sets of helical tracks per movable lens cell.

During the development of the technology described herein, a rotating cam tube was designed, manufactured, and tested. FIG. 8 shows a portion of a computer assisted design (CAD) drawing of an embodiment of a rotating cam tube comprising two sets of helical tracks. FIG. 9 shows a CAD drawing of the rotating cam tube cylinder "unrolled" to form a rectangle comprising the curves that are the helical tracks in the cylindrical rotating cam tube. FIG. 10 is a photograph of an embodiment of the technology after assembly. The optical device zoom system comprises two movable lens cells and a rotating cam tube comprising two sets of helical tracks per movable lens cell.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. An optical device zoom system comprising:
   a first lens cell comprising two followers;
   a second lens cell comprising two followers;
   and a rotating cam tube comprising a first set of two helical tracks that engage said followers of said first lens cell and a second set of two helical tracks that engage said followers of said second lens cell,
   wherein said helical tracks of said first set of helical tracks have a varying pitch over their length and said helical tracks of said second set of helical tracks have a varying pitch over their length.

2. The optical device zoom system of claim 1, wherein the optical device is a riflescope.

3. The optical device zoom system of claim 1 wherein the rotating cam tube moves the first and second lens cells with minimal or no reticle jump.

4. The optical device zoom system of claim 1 wherein said helical tracks are spaced equally around said rotating cam tube.

5. The optical device zoom system of claim 1 wherein said helical tracks are spaced unequally around said rotating cam tube.

6. A rifle comprising an optical device zoom system of claim 1.

7. A method of making an optical device system with minimal or no reticle jump, the method comprising:
   providing a first lens cell comprising two followers and a second lens cell comprising two followers in an erector tube; and
   inserting the erector tube into a rotating cam tube comprising a first set of two helical tracks that engage said followers of said first lens cell and a second set of two helical tracks that engage said followers of said second lens cell,
   wherein said helical tracks of said first set of helical tracks have a varying pitch over their length and said helical tracks of said second set of helical tracks have a varying pitch over their length.

8. The method of claim 7 wherein the optical device is a riflescope.

9. The method of claim 7 wherein the erector tube comprises a linear track.

10. The method of claim 7 further comprising:
    engaging the followers of the first lens cell with the first set of two helical tracks; and
    engaging the followers of the second lens cell with the second set of two helical tracks.

11. The method of claim 7 wherein the rotating cam tube is produced by a computer numerical control technology.

12. The method of claim 7 wherein the rotating cam tube is produced by a three-dimensional printing technology.

13. The method of claim 7 wherein the rotating cam tube is produced by a casting technology.

14. The method of claim 7 further comprising rotating said rotating cam tube.

15. The method of claim 7 further comprising moving said first lens cell and/or said second lens cell with minimal or no reticle jump.

* * * * *